United States Patent

[11] 3,633,462

[72] Inventor Edward J. Goscenski
    South Bend, Ind.
[21] Appl. No. 13,415
[22] Filed Feb. 24, 1970
[45] Patented Jan. 11, 1972
[73] Assignee The Bendix Corporation

[54] BYPASS ORIFICE FOR HYDRAULIC BOOST DEVICE
    2 Claims, 4 Drawing Figs.
[52] U.S. Cl. .................................. 91/450,
    91/391, 91/469, 137/625.48
[51] Int. Cl. ........................................F15b 11/08,
    F15b 13/04, F15b 13/10
[50] Field of Search.......................................... 137/610,
    625.48, 625.49; 91/450, 391, 469

[56] References Cited
    UNITED STATES PATENTS
    2,564,896  8/1951  Gustafsson et al............  137/625.48
    3,415,282  12/1968  Zoludow ......................  137/625.48

*Primary Examiner*—Paul E. Maslousky
*Attorneys*—William N. Antonis and Plante, Arens, Hartz, Smith and Thompson ABSTRACT: A hydraulic boost device is disclosed which includes a housing having an inlet, an outlet, and a bore communicating the inlet with the outlet. A piston is slidable in a boost chamber which is provided in the housing in fluid communication with the bore. A stepped valve member having larger, smaller and intermediate radial portions is slidable in the bore from a first position in which substantially uninhibited flow of fluid is permitted between the inlet and the outlet to a second position in which the intermediate portion of the valve defines a metering orifice with the wall of the bore. In this position, a portion of the fluid is directed into the boost chamber to slide the piston and the rest of the fluid flows through the orifice to the outlet.

INVENTOR
EDWARD J. GOSCENSKI

BY Plante, Arens, Hartz, Smith & Thompson

ATTORNEYS

BYPASS ORIFICE FOR HYDRAULIC BOOST DEVICE

BACKGROUND OF THE INVENTION

This invention relates to a hydraulic boost device for use in the brake system of an automotive vehicle.

Because of their smaller size and lower weight, hydraulic brake boosters are expected to be used in lieu of vacuum boosters in vehicles having power assisted brakes. Such a device is disclosed in U.S. Pat. application Ser. No. 793,923, filed Jan. 16, 1969, owned by the assignee of the present invention and incorporated herein by reference. This unit utilizes the pressurized fluid produced by the power steering pump to provide a hydraulic assist to the vehicle operator when the brake is applied. Since the power steering gear requires a constant supply of fluid, the brake booster must be designed to insure that sufficient fluid is passed through the booster even when the vehicle's brakes are applied. The aforementioned patent application Ser. No. 793,923 utilizes a rather complex relief valve to insure that sufficient fluid is supplied to the steering gear. Although the relief valve works quite well, the supply of fluid to the steering gear may still be interrupted momentarily while the relief valve is opening, and its complexity makes it use in mass-produced units undesirable.

SUMMARY OF THE INVENTION

Therefore, it is an important object of my invention to insure that sufficient fluid is permitted to flow through a hydraulic brake booster to operate the power steering gear of the vehicle.

Another important object of my invention is to insure that the fluid supplied to the power steering gear is not materially reduced when the brakes are applied.

Still another important object of my invention is to eliminate the need for relief valves provided on brake boosters known in the prior art, thereby reducing their cost and complexity.

DETAILED DESCRIPTION

Figure 1:
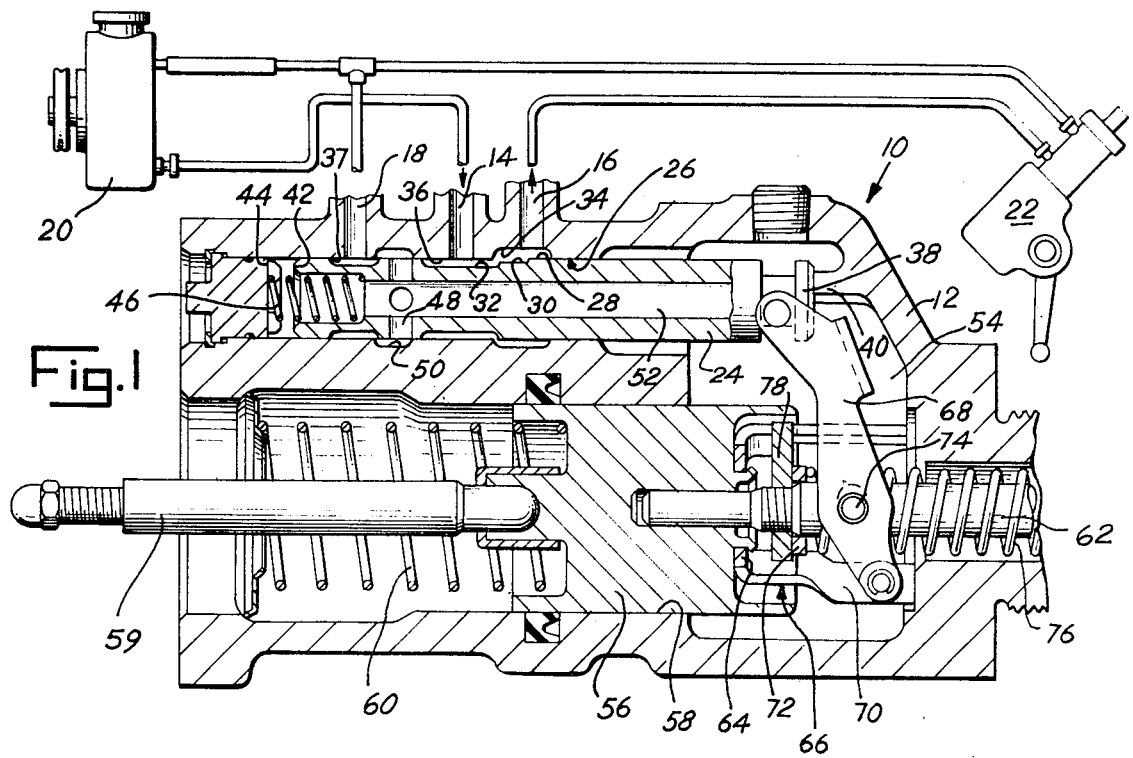
FIG. 1 is a fragmentary, longitudinal cross-sectional view of a hydraulic brake booster made pursuant to the teachings of my present invention illustrated in the brake-released position.

Referring now to the drawings, a brake booster 10 includes a housing 12 having an inlet port 14, an outlet port 16, and a return or exhaust port 18. The inlet port 14 is communicated with the high-pressure side of a power steering pump 20, and the outlet port 16 is communicated with the inlet port of a power steering gear 22. The exhaust port 18 is communicated to the low-pressure side of the pump 20 as is the outlet port of the power steering gear 22.

Figure 2:
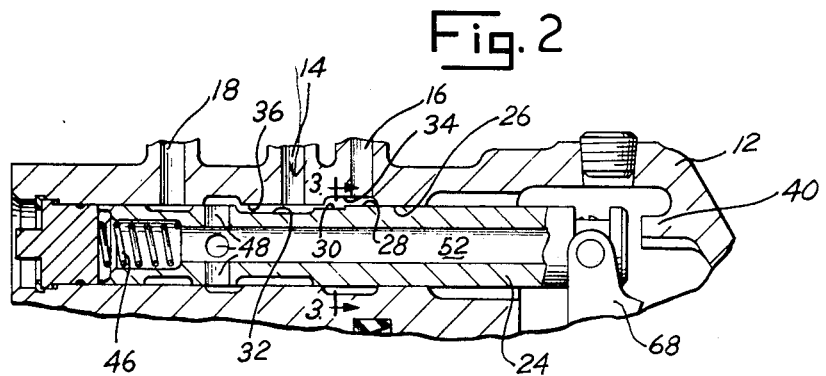
FIG. 2 is a fragmentary, longitudinal cross-sectional view of the spool valve used in the brake booster of FIG. 1 illustrated in the brake-applied position.

A spool valve 24 is slidable in a bore 26 and controls fluid communication between the ports 14, 16 and 18. Valve 24 has a stepped section presenting a larger radial portion 28, an intermediate portion 30, and a smaller portion 32. Portions 28, 30 and 32 cooperate with larger and smaller diameter portions 34 and 36 of the bore 26 to control flow of fluid through the device 10. Exhaust port 18 communicates with a groove 37 on the valve 24. Spool valve 24 is shiftable from a first position established by the engagement of one end 38 of the valve 24 with the abutment 40, as illustrated in FIG. 1, to a second position established by the engagement of the other end 42 of the valve 24 with the abutment means 44 in the opposite end of the bore, as illustrated in FIG. 2. A resilient member 46 yieldably urges the valve 24 toward the first position.

Valve member 24 further includes a plurality of circumferentially spaced, radially extending passages 48 that communicate a groove 50 in the wall of the bore 26 with a longitudinally extending passage 52 in the valve member 24. Passage 52 terminates in an opening (not shown) in the end section 38 of valve 24 so that the passage 52 is communicated with a boost chamber 54 within the housing 12.

A boost piston 56 is slidable in a longitudinal bore 58 in the housing 12, and one end of the piston 56 is slidably received in the boost chamber 54. Movement of the piston 56 is transmitted by a push rod 59 to a standard master cylinder (not shown) which is secured to the left side of the housing 12 (viewing FIG. 1). Fluid pressure is developed in the master cylinder in the normal manner when the push rod 59 is urged to the left viewing FIG. 1. A return spring 60 urges the piston 56 to the right when the brakes are released.

Actuation of the vehicle's brakes is initiated by movement of an operator-operated push rod 62 that projects from the housing 12 into the operator's compartment and is secured to the usual brake pedal. A bracket 66 is secured to the piston 56 and includes a pair of legs 70 extending therefrom generally parallel to the arms of the piston 56. One end of a pair of levers 68 (only one of which is shown) are pivotally secured to each of the legs 70 of the bracket 66, and the other ends of the levers 68 pivotally engage the valve 24. A U-shaped element 72 is slidably mounted on the push rod 62, and the levers 68 are pivotally connected to corresponding legs of the U-shaped member 72 as at 74. When the booster 10 is functioning normally, a spring 76 maintains the element 72 in engagement with a nut 78 on the push rod 62, to insure that movement of the push rod 62 will be transmitted through the levers 68 to the valve member 24. However, should a malfunction prevent pressurized fluid from being admitted into the chamber 54, when the operator-applied force on the push rod 62 exceeds the force exerted by the spring, the push rod 62 moves relative to the element 72, compressing the spring 76, and contacting the piston 56 to manually actuate the vehicle's brakes. The construction and operation of the piston 56, push rod 62, bracket 66, levers 68 and element 72 are more completely described in patent application Ser. No. 14,133, filed Feb. 25, 1970 owned by the assignee of the present invention and incorporated herein by reference.

MODE OF OPERATION

When the brakes are released, the valve member 24 is disposed in the position illustrated in FIG. 1. In this position, fluid in the boost chamber 54 is exhausted through the passages 52 and 48 and the grooves 50 and 37 to the exhaust port 18. Fluid flow through the inlet 14 is communicated substantially unhindered to the outlet port 16.

Figure 3:
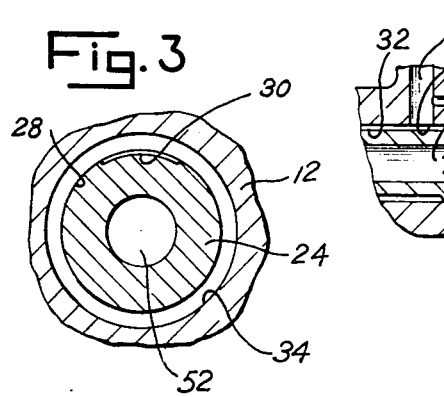
FIG. 3 is a cross-sectional view of the spool valve used in my brake booster taken substantially along line 3—3 of FIG. 2.

When the vehicle operator applies the brakes, the push rod 62 is urged to the left viewing FIG. 1. Movement of the rod 62 will be transmitted through the bracket 66 to the piston 56. Simultaneously, movement of the rod 62 will be transmitted through the levers 68 to the valve 24, driving the latter to the left viewing FIGS. 1 and 2 toward the position illustrated in FIG. 2. As the valve 24 is shifted, the spool valve 24 cooperates with the wall of the bore 26 to close fluid communication between the grooves 50 and 37, thereby isolating the exhaust port 18 from the fluid content of the boost chamber 54. At the same time, the intermediate size portion of the spool valve 24 is slidably received in the smaller diameter portion 36 of the bore 26. Since the diameter of the valve intermediate size portion 30 is less than the smaller diameter portion 36 of the bore 26, a metering orifice 78 is defined between the inlet port 14 and the outlet port 16. As can best be seen in FIG. 3, the intermediate portion 30 may extend only part of the way around the valve means 24, thus limiting the size of the orifice 78. The size of this orifice is carefully calculated to assure a sufficient volume of flow therethrough to operate the power steering gear 22.

Since flow through the orifice 78 is restricted, the pressure level in the inlet port 14 increases, thereby forcing a portion of the fluid flow into the groove 50 from where it is communicated into the boost chamber 54 through the passages 48 and 52. Fluid pressure in the boost chamber 54 acts on the end of the boost piston 56 forcing the latter to the left viewing FIG. 1, thereby providing a hydraulic assist for the vehicle operator when the brakes are applied. When the operator releases the brakes, the resilient member 46 urges the spool valve 24 to the right viewing FIG. 1. When the brakes are relieved, springs 46 and 60 urge the valve member and the piston 56 toward the position illustrated in the drawing.

Figure 4:
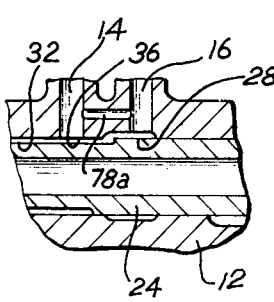
FIG. 4 is a fragmentary, longitudinal, cross-sectional view similar to FIGS. 1 and 2 but illustrating another embodiment of my brake booster.

In the alternate embodiment of FIG. 4, elements substantially the same as those in the preferred embodiment retain the same reference character. In FIG. 4, a channel 78a, is provided in the housing 12 communicating the inlet port 14 with the outlet port 16. The spool valve 24 is provided with only the larger and smaller diameter portions 28 and 32. When the valve 24 is urged toward the left viewing FIG. 1 such that the engagement of the larger diameter portion 32 of the valve 24 slidably engages the smaller diameter section 36 of the bore 26 thereby terminating fluid communication between the inlet port 14 and the outlet port 16, the resulting fluid pressure increases in the inlet port 14 will direct a portion of the fluid through the channel 68 to the outlet port 16. The diameter of the channel is carefully calculated so that only a portion of the fluid flowing into the inlet is directed to the outlet, the remaining fluid being directed into the boost chamber 54 by the valve 24. A constant supply of fluid to the power steering gear 22 is therefore assured.

I claim:
1. In a hydraulic boost device:
a housing having an inlet, an outlet, and a bore communicating the inlet with the outlet;
a boost chamber in said housing in fluid communication with the bore;
a piston slidable in said boost chamber;
said bore being stepped to present larger and smaller radial portions;
stepped valve means slidable in the larger and smaller radial portions of said bore;
said valve means being slidable from a first position disposing the smaller portion of the valve in the smaller portion of the bore and the larger portion of the valve in the larger portion of the bore to permit substantially unhindered flow of fluid from the inlet to the outlet to a second position disposing a section the larger portion of said valve in the smaller portion of said bore in which position a portion of the fluid flow is directed into said boost chamber for sliding said piston;
said valve larger portion cooperating with said bore smaller portion to define an opening therebetween when said valve intermediate portion is disposed in said bore smaller portion whereby at least some of the fluid is permitted to flow from the inlet to the outlet when the valve means is in said second position.

2. In a hydraulic boost device:
a housing having an inlet, an outlet, and a bore communicating the inlet with the outlet;
a boost chamber in said housing in fluid communication with said bore;
a piston slidable in said boost chamber;
stepped valve means slidable in said bore presenting larger, smaller and intermediate radial portions;
said valve means being shiftable from a first position in which substantially unhindered flow of fluid from the inlet to the outlet is permitted to a second position in which said valve intermediate portion cooperates with the wall of the bore to define a metering orifice therebetween to direct a portion of said fluid into said boost chamber to shift said piston, the remainder of the fluid flowing through said orifice to said outlet;
said bore being stepped to establish larger and smaller diameter portions;
said valve means in said first position disposing said larger portion of the valve means in said larger portion of the bore and said smaller portion of the valve means in the smaller portion of the bore, said valve means in said second position disposing at least part of said larger portion of the valve means in the smaller portion of the bore to establish said orifice.

* * * * *